(12) United States Patent
Lu et al.

(10) Patent No.: US 10,613,372 B2
(45) Date of Patent: Apr. 7, 2020

(54) DISPLAY DEVICE AND DISPLAY METHOD

(71) Applicant: BOE TECHNOLOGY GROUP CO., LTD., Beijing (CN)

(72) Inventors: Pengcheng Lu, Beijing (CN); Xiaochuan Chen, Beijing (CN); Shengji Yang, Beijing (CN); Lei Wang, Beijing (CN); Dongni Liu, Beijing (CN); Han Yue, Beijing (CN); Jie Fu, Beijing (CN); Li Xiao, Beijing (CN); Jian Gao, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/090,814

(22) PCT Filed: Feb. 12, 2018

(86) PCT No.: PCT/CN2018/076475
§ 371 (c)(1),
(2) Date: Oct. 2, 2018

(87) PCT Pub. No.: WO2018/192298
PCT Pub. Date: Oct. 25, 2018

(65) Prior Publication Data
US 2019/0129244 A1    May 2, 2019

(30) Foreign Application Priority Data

Apr. 20, 2017 (CN) .......................... 2017 1 0261102

(51) Int. Cl.
*G02F 1/1335* (2006.01)
*G02F 1/13357* (2006.01)
(Continued)

(52) U.S. Cl.
CPC ..... *G02F 1/133524* (2013.01); *G02B 6/0035* (2013.01); *G02F 1/1336* (2013.01);
(Continued)

(58) Field of Classification Search
CPC ............ G02F 1/133524; G02F 1/1336; G02F 1/1362; G02F 1/133504; G02F 1/133553; G02F 2001/133616; G02B 6/0035
See application file for complete search history.

(56) References Cited

U.S. PATENT DOCUMENTS 6,545,734 B2    4/2003 Cornelissen et al.
6,774,960 B2    8/2004 Cornelissen et al.
(Continued)

FOREIGN PATENT DOCUMENTS

CN    1343290 A    4/2002
CN    1808238 A    7/2006
(Continued)

OTHER PUBLICATIONS

Chinese Office Action dated Apr. 19, 2019, received for corresponding Chinese Application No. 201710261102.2.
(Continued)

*Primary Examiner* — Dung T Nguyen
(74) *Attorney, Agent, or Firm* — Kinney & Lange, P.A.

(57) ABSTRACT

A display device and a display method are provided. The display device includes: a light source; a light guide plate; and a liquid crystal display panel including a first substrate and a second substrate aligned with and assembled to the first substrate and a liquid crystal layer between the first substrate and the second substrate. A light transmitting pattern is provided in the light guide plate, and an incident light from the light source is configured to transmit through the light transmitting pattern of the light guide plate to form monochromatic lights of at least three colors. The light
(Continued)

source is time-divisionally lit, so that the monochromatic lights of at least three colors are time-divisionally irradiated onto a same sub-pixel electrode on the first substrate in each frame time to form reflected lights, and then the reflected lights are modulated by the liquid crystal layer to be displayed.

8 Claims, 6 Drawing Sheets

(51) Int. Cl.
    *G02F 1/1362*     (2006.01)
    *F21V 8/00*     (2006.01)

(52) U.S. Cl.
    CPC ...... *G02F 1/1362* (2013.01); *G02F 1/133504* (2013.01); *G02F 1/133553* (2013.01); *G02F 1/133615* (2013.01); G02B 6/009 (2013.01); G02B 6/0036 (2013.01); G02B 6/0068 (2013.01); G02B 6/0076 (2013.01); G02F 2001/133616 (2013.01)

(56) References Cited

U.S. PATENT DOCUMENTS

| | | |
|---|---|---|
| 7,884,789 B2 | 2/2011 | Takahashi et al. |
| 2001/0035852 A1* | 11/2001 | Yoshihara ............ G09G 3/3651 345/87 |
| 2002/0071142 A1* | 6/2002 | Otani ..................... G06T 1/60 358/515 |
| 2003/0214725 A1 | 11/2003 | Akiyama |
| 2007/0285403 A1 | 12/2007 | Aota et al. |
| 2010/0118403 A1 | 5/2010 | Laitinen et al. |
| 2012/0127751 A1 | 5/2012 | Kimmel |
| 2017/0168452 A1 | 6/2017 | Matsuo |
| 2017/0352329 A1* | 12/2017 | Imai ..................... G09G 5/10 |
| 2017/0363794 A1 | 12/2017 | Wan et al. |

FOREIGN PATENT DOCUMENTS

| | | |
|---|---|---|
| CN | 101002250 A | 7/2007 |
| CN | 101620290 A | 1/2010 |
| CN | 101739984 A | 6/2010 |
| CN | 202256960 U | 5/2012 |
| CN | 103197477 A | 7/2013 |
| CN | 103208235 A | 7/2013 |
| CN | 104460115 A | 3/2015 |
| CN | 105082869 A | 11/2015 |
| CN | 106873244 A | 6/2017 |
| WO | 2016046863 A1 | 3/2016 |

OTHER PUBLICATIONS ntemational Search Report and English Translation of Box V of the Written Opinion dated May 9, 2018, received for corresponding Chinese Application No. PCT/CN2018/076475.

Second Chinese Office Action dated Jul. 8, 2019, received for corresponding Chinese Application No. 201710261102.2.

* cited by examiner

DISPLAY DEVICE AND DISPLAY METHOD

CROSS-REFERENCE TO RELATED APPLICATION

This application is a Section 371 National Stage Application of International Application No. PCT/CN2018/076475, filed on Feb. 12, 2018, entitled "DISPLAY DEVICE AND DISPLAY METHOD", which claims priority to Chinese Patent Application No. 201710261102.2 filed on Apr. 20, 2017 with CNIPA, incorporated herein by reference in entirety.

BACKGROUND

Technical Field

Embodiments of the present disclosure relate to, but are not limited to, the field of display technology, and in particular, to a display device and a display method.

Description of the Related Art

With a development and upgrade of display technology, various types of displays have appeared, including for example a liquid crystal display (abbreviated as LCD hereinafter). In a display, a display device for performing optical processing to generate a plurality of colors is a constituent part of the display.

LCDs typically include a reflective LCD and a transmissive LCD. Typically, a single sub-pixel electrode corresponds to only one primary color to be displayed, such as R, G or B, and the number of pixels per inch (PPI for short) is limited.

SUMMARY

An embodiment of the present disclosure provides a display device, comprising:

a light source;

a light guide plate; and a liquid crystal display panel comprising a first substrate and a second substrate aligned with and assembled to the first substrate and a liquid crystal layer between the first substrate and the second substrate, wherein a light transmitting pattern is provided in the light guide plate, and an incident light from the light source is configured to transmit through the light transmitting pattern in the light guide plate to form monochromatic lights of at least three colors;

wherein the light source is time-divisionally lit, so that the monochromatic lights of at least three colors are time-divisionally irradiated onto a same sub-pixel electrode on the first substrate in each frame time to form reflected lights, and then the reflected lights are modulated by the liquid crystal layer to be displayed.

As an example, the first substrate is a thin film transistor substrate, and the second substrate is a transparent substrate.

As an example, the light source comprises a white light source; or the light source comprises monochromatic light sources capable of emitting lights of at least three colors respectively.

As an example, the light source comprises a first light source, a second light source and a third light source, the first light source, the second light source and the third light source are all white light sources; or, the first light source is a first monochromatic light source, the second light source is a second monochromatic light source, and the third light source is a third monochromatic light source, and colors of lights emitted by the first monochromatic light source, the second monochromatic light source and the third monochromatic light source are different from one another, the light guide plate is a three-layer light guide plate, the first light source is disposed on a light entrance side of a first layer of light guide plate, the second light source is disposed on a light entrance side of a second layer of light guide plate, and the third light source is disposed on a light entrance side of a third layer of light guide plate.

As an example, the first light source, the second light source and the third light source are time-divisionally lit in each frame time, each of the first light source, the second light source and the third light source is lit for one-third of each frame time, and incident lights from the first light source, the second light source and the third light source transmit through the light transmitting patterns in the three-layer light guide plate, to respectively form the monochromatic lights of three colors in a time-division manner, so as to be irradiated onto the same sub-pixel electrode on the first substrate.

As an example, in case where the first light source, the second light source and the third light source are all white light sources, a sequence of the monochromatic lights irradiated onto one of adjacent sub-pixel electrodes is same as or different from a sequence of the monochromatic lights irradiated onto another of the adjacent sub-pixel electrodes, depending on light transmitting patterns disposed in the three-layer light guide plate.

As an example, the light transmitting patterns is a nano-structured light transmitting pattern, and the incident light from the light source is irradiated onto the first substrate in a direction perpendicular to the first substrate through the nano-structured light transmitting pattern; and wherein the light guide plate comprises at least three layers of light guide plate, and projections of light transmitting patterns in the three layers of light guide plate corresponding to the same sub-pixel electrode overlap with one another in a projection plane of the light guide plate in a direction perpendicular to the light guide plate.

An embodiment of the present disclosure further provides a display method, comprising:

time-divisionally lighting a light source so that monochromatic lights of at least three colors formed by an incident light from the light source transmitting through a light transmitting pattern in a light guide plate are time-divisionally irradiated onto a same sub-pixel electrode on a first substrate in each frame time, to form reflected lights; and modulating the reflected lights by a liquid crystal layer, so as to be displayed.

As an example, the light source comprises a first light source, a second light source and a third light source, the first light source, the second light source and the third light source are all white light sources; or, the first light source is a first monochromatic light source, the second light source is a second monochromatic light source, and the third light source is a third monochromatic light source, and colors of lights emitted by the first monochromatic light source, the second monochromatic light source and the third monochromatic light source are different from one another, the light guide plate is a three-layer light guide plate, the first light source is disposed on a light entrance side of a first layer of light guide plate, the second light source is disposed on a light entrance side of a second layer of light guide plate, and the third light source is disposed on a light entrance side of a third layer of light guide plate, the time-divisionally lighting the light source so that the monochromatic lights of at least three colors formed by the incident light from the light source transmitting through the light transmitting patterns in the light guide plate are time-divisionally irradiated onto the same sub-pixel electrode on the first substrate in each frame time comprises:

time-divisionally lighting the first light source, the second light source and the third light source in each frame time, each of the first light source, the second light source and the third light source being lit for one-third of each frame time, and incident lights from the first light source, the second light source and the third light source transmitting through the light transmitting pattern in the three-layer light guide plate, to respectively form the monochromatic lights of three colors in a time-division manner, so as to be irradiated onto the same sub-pixel electrode on the first substrate.

As an example, the light transmitting pattern is a nano-structured light transmitting pattern, and the incident light of the light source is irradiated onto the first substrate in a direction perpendicular to the first substrate through the nano-structured light transmitting pattern; and wherein the light guide plate comprises at least three layers of light guide plate, and light transmitting patterns in the three layers of light guide plate corresponding to the same sub-pixel electrode overlap with one another in a projection plane of the light guide plate in a direction perpendicular to the light guide plate.

Other features and advantages of the embodiments of the present disclosure will be set forth in the following description, and they will be obvious in view of such a description or understood by those skilled in the art with reference to the embodiments of the present disclosure. Objectives and other advantages of the embodiments of the present disclosure can be realized and obtained by the structures particularly pointed out in the specification, the claims and the accompanying drawings.

BRIEF DESCRIPTION OF THE DRAWINGS

The drawings are used to provide a further understanding of technical solutions of the present disclosure, and constitute a part of the specification, and they are provided to explain the technical solutions of the present disclosure with reference to the embodiments of the present disclosure, but do not form a limitation to the technical solutions of the present disclosure.

DETAILED DESCRIPTION OF PREFERRED EMBODIMENTS

In order to make objectives, technical solutions and advantages of the embodiments of the present disclosure more clear, the embodiments of the present disclosure will be described in detail below with reference to the accompanying drawings. It should be noted that the embodiments of the present disclosure and the features in the embodiments may be freely combined with each other in case of no conflicts.

Embodiments of the present disclosure provide a display device and a display method to at least partially increase the PPI of the display device.

Figure 1:
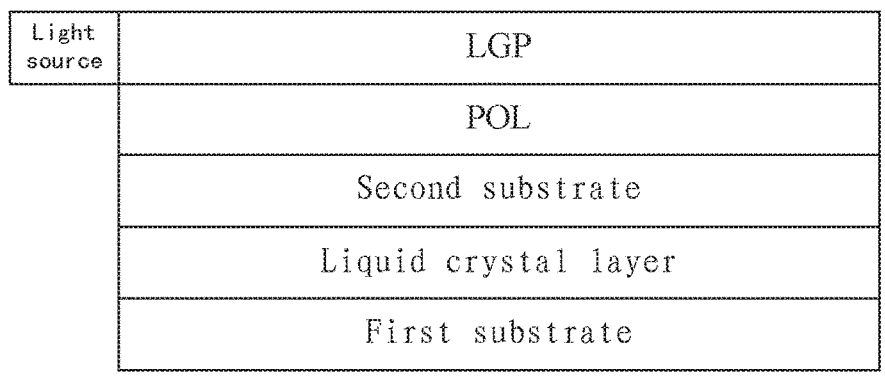
FIG. 1 is a schematic structural view of a display device.

As shown in FIG. 1, it is a schematic structural view of a display device. The display device is a reflective display device, with a basic structure thereof comprising: a first substrate and a second substrate aligned with and assembled to the first substrate, and a polarizer (abbreviated as POL) and a light guide panel (abbreviated as LGP). The first substrate may be a thin film transistor (abbreviated as TFT) substrate, the second substrate may be a color filter (abbreviated as CF) substrate, with a liquid crystal layer being provided between the first substrate and the second substrate. A light source is provided on a side of the LGP. In the condition of ambient light, a natural light may be used as an incident light, while in a dark condition, a light source may be used to generate the incident light. The incident light is incident onto the LGP, and light transmitting patterns in the LGP are used to control illumination positions of emergent lights, and then the emergent lights are irradiated onto each sub-pixel electrode of the TFT substrate through the POL, the CF substrate and the liquid crystal layer. In the above display device, gray scales of the emergent lights are controlled by modulation of the liquid crystal layer, and red, green and blue (abbreviated as RGB) color cells disposed on the CF substrate are used to realize respective emissions of three primary colors of R, G, and B, thereby achieving colorful display effects presenting on the display device.

In the related art, a single sub-pixel electrode corresponds to only one primary color to be displayed, such as R, G or B, and the number of pixels per inch (PPI for short) is limited.

Figure 2:
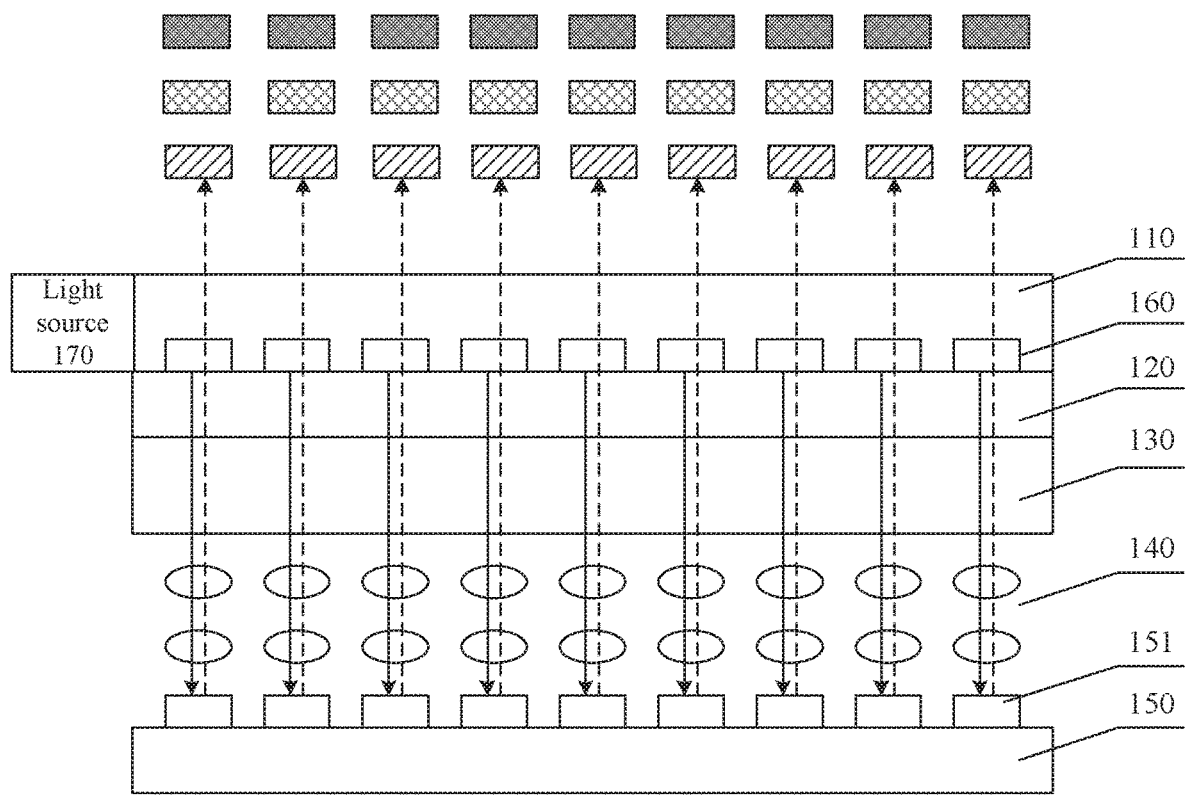
FIG. 2 is a schematic structural view of a display device according to an embodiment of the present disclosure.

As shown in FIG. 2, a display device according to an embodiment of the present disclosure includes: a light source 170, a light guide plate 110 and a liquid crystal display panel, the liquid crystal display panel includes a first substrate 150 and a second substrate 130 aligned with and assembled to the first substrate, and a liquid crystal layer 140 between the first substrate 150 and the second substrate 130.

The light guide plate 110 is provided with light transmitting patterns 160, through which incident light from the light source 170 forms monochromatic lights of at least three colors.

The light source 170 is time-divisionally lit, so that the monochromatic lights of the at least three colors are time-divisionally irradiated onto a same sub-pixel electrode 151 on the first substrate 150 in each frame time to form reflected lights, and then the reflected lights are modulated by the liquid crystal layer 140 to be displayed.

In the embodiment of the present disclosure, since the light source 170 is time-divisionally lit, the monochromatic lights of at least three colors are time-divisionally irradiated onto a same sub-pixel electrode 151 on the first substrate 150 in each frame time, that is to say, monochromatic lights of at least three colors may be displayed at a location of each sub-pixel cell, rather than only one monochromatic light being displaying thereat, thereby increasing the PPI of the display device.

As an example, the first substrate 150 is a TFT substrate, and the second substrate 130 is a transparent substrate (which may also be referred to as a color filter substrate without RGB color resistances), whose material is generally glass, or any other material whose refractive index is approximate to glass. A polarizer 120 is further provided between the second substrate 130 and the light guide plate 110. Since monochromatic lights of at least three colors by means of the light source 170 may be displayed at the location of each sub-pixel cell, the second substrate 130 may adopt a color film substrate without RGB color resistances, that is, a transparent substrate. Compared with a color film substrate with RGB color resistances in the related art, the embodiment of the present disclosure may effectively improve utilization of the incident light and in turn increase light output brightness of the display device.

As an example, the light transmitting patterns 160 are nano-structured light transmitting patterns, and the incident light from the light source 170 is irradiated onto the first substrate 150 in a direction perpendicular to the first substrate through the nano-structured light transmitting patterns. The light guide plate is that of a structure of at least three layers, and the light transmitting patterns of the three layers of light guide plate corresponding to the same sub-pixel electrode overlap with one another in a projection plane of the light guide plate in a direction perpendicular to the light guide plate.

In the related art, after the incident light transmits through the light transmitting patterns in the light guide plate, emergent lights are emitted towards the sub-pixel electrode on the TFT substrate at a certain angle, and then the emergent lights are reflected back by the sub-pixel electrode on the TFT substrate. The reflected lights have a certain angle with respect to the emergent lights irradiated onto the TFT substrate, which results in a relatively poor color contrast of the display device and a cross color phenomenon. In the embodiment of the present disclosure, the emergent lights irradiated onto the TFT substrate and the monochromatic lights emitted after being reflected by a reflective layer on the TFT substrate are both perpendicular to the TFT substrate, thereby improving the contrast of the display device and reducing possibility of cross color.

Figure 3:
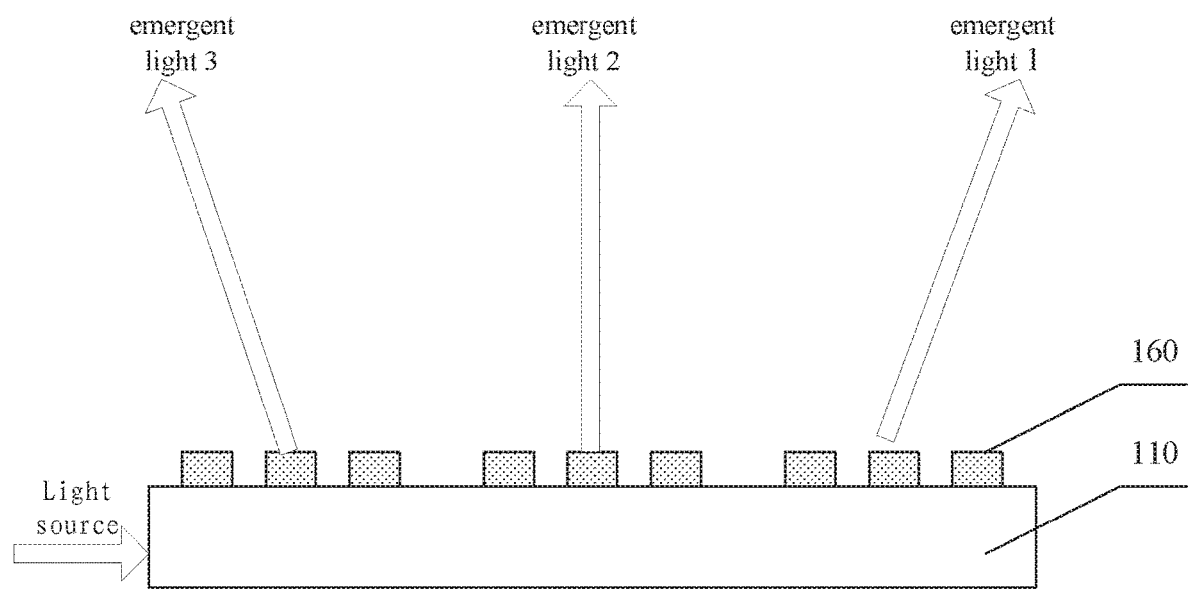
FIG. 3 is a schematic structural view of a light guide plate in a display device according to an embodiment of the present disclosure.
Figure 4:
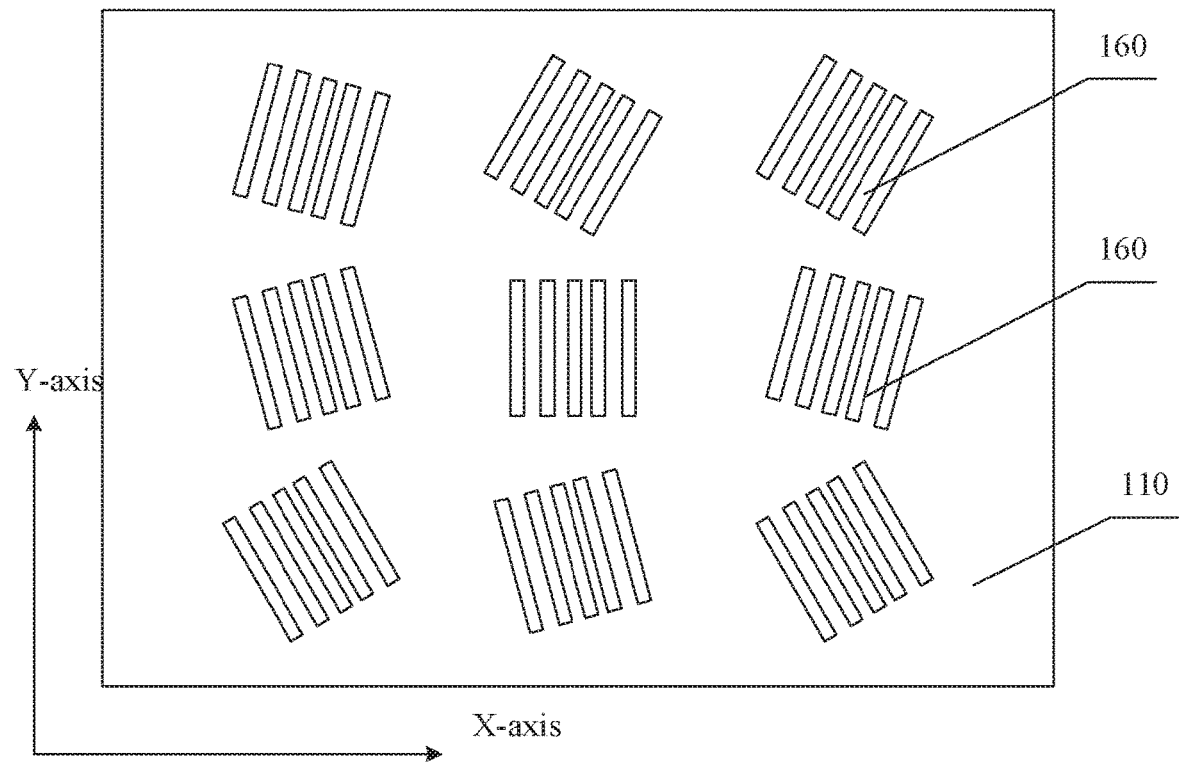
FIG. 4 is a schematic structural view of light transmitting patterns in a light guide plate in a display device according to an embodiment of the present disclosure.

In the display device according to the embodiment of the present disclosure, at least three types of light transmitting patterns 160 having nano-structures are provided in the light guide plate 110, and positions of the at least three types of light transmitting patterns 160 having nano-structures in the light guide plate 110 may be designed to adjust wavelength and angle of the emergent lights. FIG. 3 is a schematic structural view of a light guide plate in a display device according to an embodiment of the present disclosure, and FIG. 4 is a schematic structural view of light transmitting patterns in a light guide plate in a display device according to an embodiment of the present disclosure. With reference to FIGS. 3 and 4, the incident light is emitted into the light guide plate 110, and after being totally reflected in the light guide plate 110, the light reaches the at least three types of light transmitting patterns 160 having nano-structures. Each of the light transmitting patterns 160 may be a surface recessed in the light guide plate 110, or a surface protruded out of the light guide plate 110. For example, if the light transmitting pattern 160 is a surface recessed in the light guide plate 110, a cross section of the light transmitting pattern 160 may be of an inverted trapezoidal structure, and each recessed portion may have a size of several tens of nanometers. The cross sectional shape and the specific size of each of the light transmitting patterns 160 are not limited in the embodiments of the present disclosure, and they may be adjusted according to actual conditions when designing, as long as it can form monochromatic lights of different wavelengths which may be perpendicularly emitted out to satisfy requirements of the embodiments of the present disclosure. It can be seen from FIG. 3 that the incident light undergoes diffraction effects of the different light transmitting patterns 160 to form emergent lights having different light exit angles and different wavelengths. As shown in FIG. 4, in case where setting angles of the different light transmitting patterns 160 (setting angles of the light transmitting patterns in the light guide plate 110) are different, angles of the emergent lights are also different. The implementation of controlling the angles of the emergent lights may be performed by setting the following parameters:

Incident light vector $K_{in}=(n_{\textit{eff}}, 0, 0)*2\pi/\lambda$;

Emergent light vector $K_{out}=(n_x, n_y, n_z)*2\pi/\lambda$.

Variables in the above parameters satisfy the following formula:

$$\begin{cases} n_x = n_{\textit{eff}} - (\lambda/\wedge)\cos\theta \\ n_y = -(\lambda/\wedge)\sin\theta \\ n_x^2 + n_y^2 + n_z^2 = 1 \end{cases} \quad (1)$$

In the above formula (1), $n_{\textit{eff}}$ is a refractive index of the material of the light guide plate 110, which may be different if the light guide plate 110 is made from different materials; $\lambda$ is a wavelength of the incident light; $\wedge$ is a minimum feature size (pitch) of the light transmitting pattern 160, that is, a size of a complete unit in the light transmitting pattern 160; $\theta$ is an angle of the light transmitting pattern 160 in an XY plane, for example, an angle between an overall direction or an extending direction of the light transmitting pattern in the XY plane with respect to a Y-axis. As shown in FIG. 4, one side of the light guide plate 110 is set to an X-axis, and the other side of the light guide plate 110 is set to the Y-axis. In FIG. 4, the light transmitting patterns in the upper row have an angle inclined towards the right side, the light transmitting patterns in the lower row have an angle inclined towards the left side, the light transmitting pattern in the right side in the middle row has an angle inclined towards the right side, and the light exiting pattern in the left side in the middle row has an angle inclined towards the left side. The light exiting pattern 160 in the middle of the light guide plate 110 has $\theta$ of 0; and after the incident light is diffracted by the light exiting patterns 160, the emergent light is perpendicular to the light guide plate 110, that is, it can be perpendicularly irradiated onto the TFT substrate 150. Since the other light transmitting patterns 160 have certain angles with respect to the XY plane, the angles of the emergent lights are different.

Based on the optical principle of the incident light in the light guide plate 110, the light transmitting patterns 160 having nano-structures in the light guide plate 110 may be reasonably designed in such a way that the incident light entering the light guide plate 110 is converted to emergent lights having specific angles and wavelengths. In practical applications, the $\theta$ of the light transmitting pattern 160 may be designed to achieve the perpendicularly-emitted emergent light. In addition, since the incident light is totally reflected in the light guide plate 110, the minimum feature size (pitch) and/or θ of the light transmitting pattern 160 may be designed to form emergent lights of different wavelengths. For example, the pitches of the light transmitting patterns 160 are set to be the same, and the emergent lights of different wavelengths are achieve by changing θ; or, the θ of the light transmitting patterns 160 are set to be the same, and the emergent lights of different wavelengths are achieve by changing the pitches; or, it is possible to simultaneously change the pitches and θ. That is, by configuring the minimum feature size of each of the at least three types of light transmitting patterns 160 and/or the setting angle thereof in the light guide plate, it is possible to form emergent lights including at least a first monochromatic, a second monochromatic light, and a third monochromatic light. For example, the first monochromatic light, the second monochromatic light and the third monochromatic light formed by transmitting incident light through the light transmitting patterns 160 are red (R), green (G), and blue (B), respectively.

In practical applications, monochromatic lights of other wavelengths may be achieved by changing the light transmitting patterns 160 in the light guide plate 110, for example, the incident light may be split into red light, yellow light, and blue light. In addition, by providing four types of light transmitting patterns 160 in the light guide plate 110, the incident light may be split into four types of monochromatic lights. That is, in the embodiments of the present disclosure, neither the number of the types of the monochromatic lights which are split into from the incident light by the at least three types of light transmitting patterns 160 having nano-structures disposed in the light guide plate 110, nor the wavelengths of the monochromatic lights which are split into from the incident light by the at least three types of light transmitting patterns 160, may be limited. They may be selected and configured by a designer according to actual needs of a product.

In an embodiment of the present disclosure, the light source comprises a white light source or monochromatic light sources capable of emitting lights of at least three colors respectively. The following description will be respectively made with specific examples.

The light source refers to monochromatic light sources capable of emitting lights of at least three colors respectively.

Figure 5:
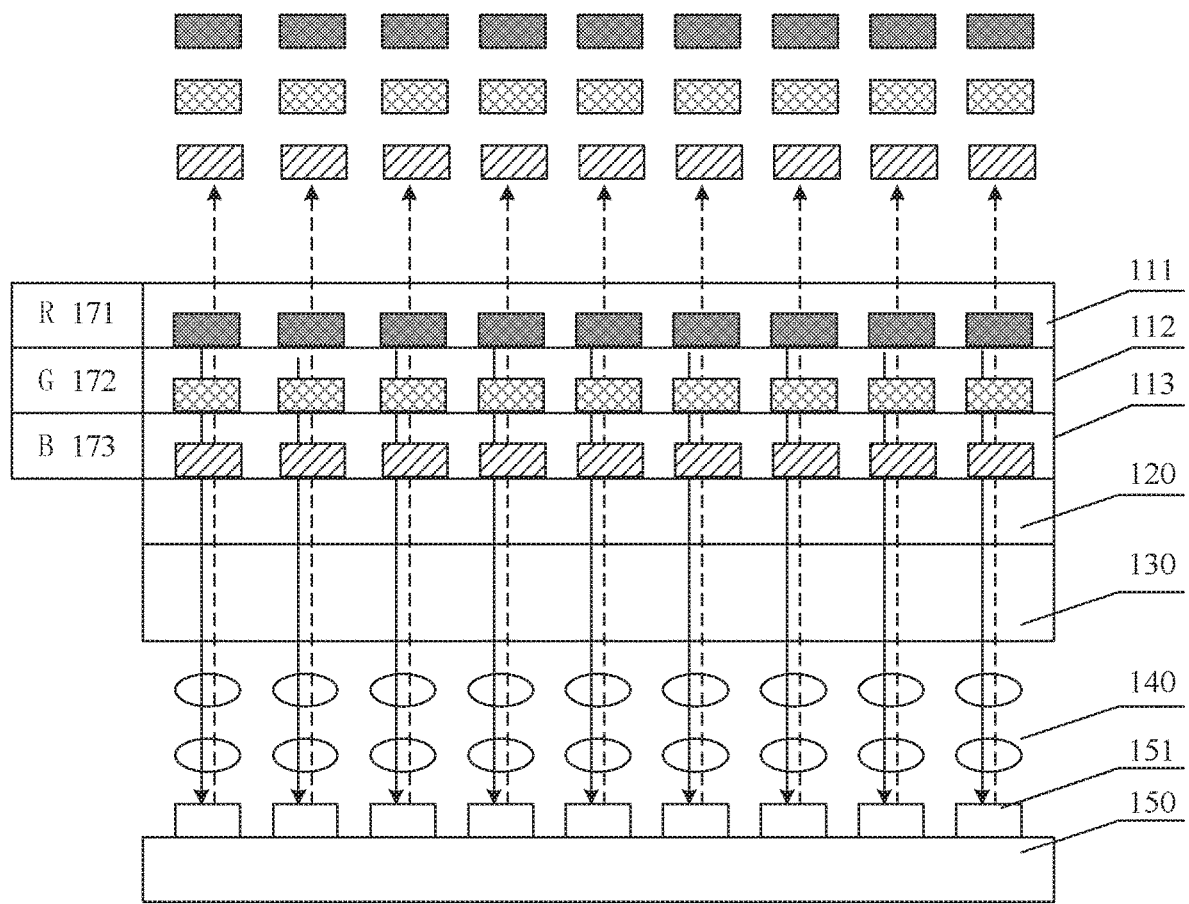
FIG. 5 is a schematic structural view of a display device according to an embodiment of the present disclosure.

Taking the light source including monochromatic light sources of three colors as an example, as shown in FIG. 5, the light source 170 includes a first light source 171, a second light source 172 and a third light source 173, wherein the first light source 171 is a first monochromatic light source, the second light source 172 is a second monochromatic light source, and the third light source 173 is a third monochromatic light source.

The light guide plate 110 is a three-layer light guide plate. The first light source 171 is disposed on a light entrance side of a first layer of light guide plate 111, the second light source 172 is disposed on a light entrance side of a second layer of light guide plate 112, and the third light source 173 is disposed on a light entrance side of a third layer of light guide plate 113.

In this embodiment, as an example, the first light source 171, the second light source 172, and the third light source 173 correspond to three colors of red (R), green (G) and blue (B), respectively.

Figure 6:
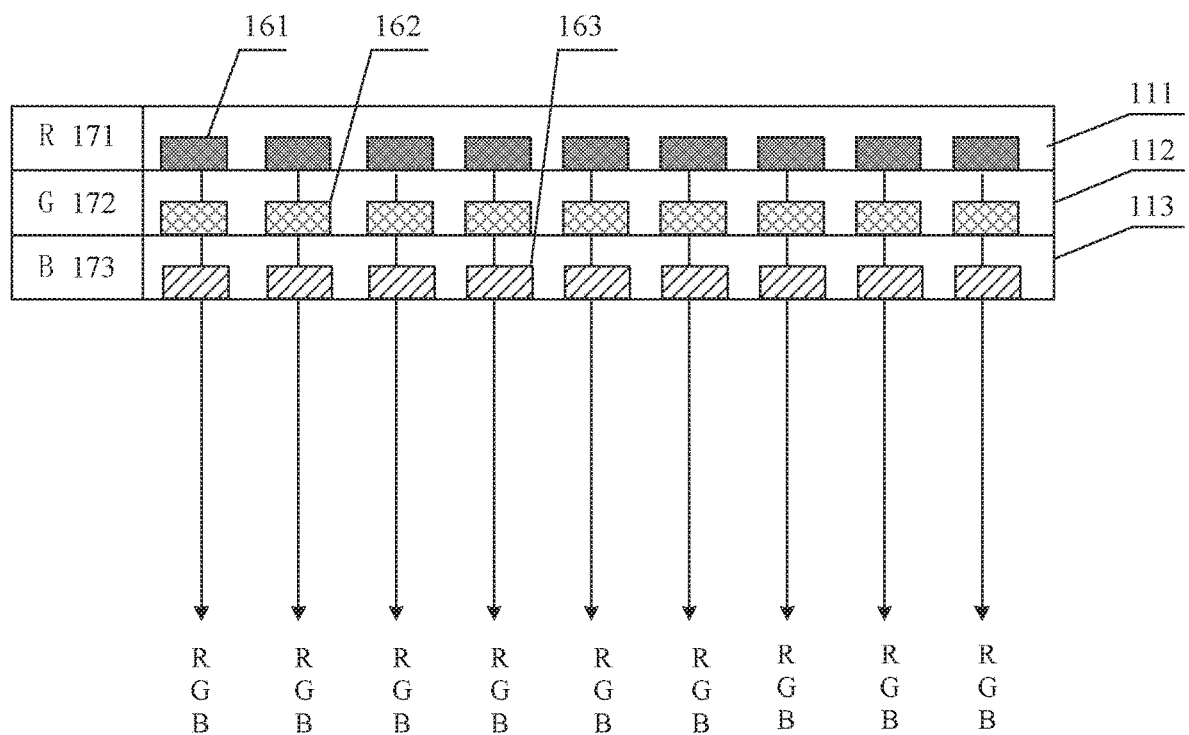
FIG. 6 is a schematic view showing emergent lights from a multilayer light guide plate in the display device shown in FIG. 5.

As shown in FIG. 5 and FIG. 6, different light transmitting patterns 160 are respectively disposed on the layers of light guide plate, and first light transmitting patterns 161 are provided in the first layer of light guide plate 111, second light transmitting patterns 162 are provided in the second layer of light guide plate 112, and third light transmitting patterns 163 are provided on the third layer of light guide plate 113. The first light source 171 can output first monochromatic lights through the first light transmitting patterns 161, the first monochromatic lights are red lights in this embodiment; the second light source 172 can output second monochromatic lights through the second light transmitting patterns 162, the second monochromatic lights are green lights in this embodiment; the third light source 173 can output third monochromatic lights through the third light output patterns 163, the third monochromatic lights are blue lights in this embodiment.

The first light source 171, the second light source 172 and the third light source 173 are time-divisionally lit in each frame time, each of the first light source, the second light source and the third light source is lit for one-third of each frame time, and incident lights from the first light source, the second light source and the third light source transmit through the light transmitting patterns of the three-layer light guide plate, to respectively form the monochromatic lights of three colors in a time-division manner, so as to be irradiated onto the same sub-pixel electrode on the first substrate.

Figure 7:
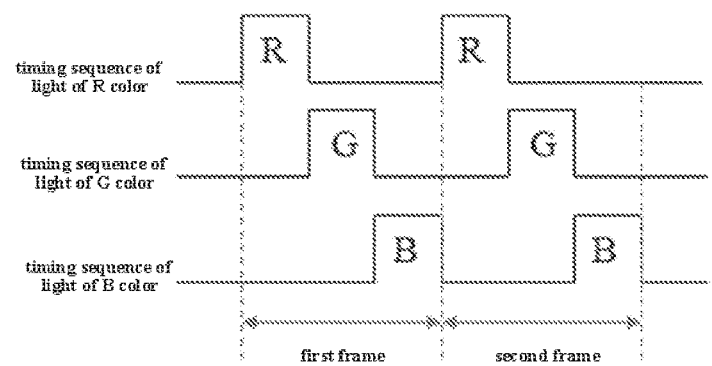
FIG. 7 is a timing diagram showing a time-division lighting of light sources in the display device shown in FIG. 5.

As can be seen from FIG. 5 and FIG. 6, in this embodiment, the incident lights from the light sources are irradiated onto the first substrate 150 in a direction perpendicular to the first substrate through the light transmitting patterns, and projections of the light transmitting patterns (i.e., 161, 162, and 163) in the three layers of light guide plate corresponding to the same sub-pixel electrode overlap with one another in a projection plane of the light guide plate in a direction perpendicular to the light guide plate. The term 'overlap' refers to a positional overlap of the projections of the light transmitting patterns in the projection plane of the light guide plate in the direction perpendicular to the light guide plate, and the minimum feature size (pitch) of the light transmitting patterns in each layer may be different. As shown in FIG. 7, it is a timing diagram showing a time-division lighting of the light sources, it can be seen from the figure that the three light sources are time-divisionally lit in one frame. For example, if one frame time is 1/60s, the red, green, and blue primary light sources are each time-divisionally lit for 1/180s, thereby realizing RGB three-primary-color display at the location of one sub-pixel cell. Compared with the solution that only one primary color can be displayed in one sub-pixel cell in the related art, it achieves a display with a higher PPI.

It should be noted that the timing sequence of time-division lighting of the light sources may be changed, and it is not limited to the timing diagram in FIG. 7, as long as each monochromatic light is time-divisionally lit in one frame. That is, the timing sequence may always be GBR, or BRG; or, the timing sequence of the lighting in a first frame may be RGB, the timing sequence of the lighting in a second frame may be GBR, and the timing sequence of the lighting in a third frame may be BRG, and the timing sequences change among frames repeatedly in this way. That is to say, since the timing sequences of time-division lighting of the light sources are different, the sequences of the monochromatic lights irradiated on the adjacent sub-pixel electrodes may be the same or different, and the sequences of primary color components of pixel images of the adjacent three sub-pixel electrodes may be different.

In addition, in the embodiment of the present disclosure, the light guide plate 110 has three layers, which respectively correspond to three primary color light sources. In other embodiments, the light guide plate 110 may be of other structures. For example, the light guide plate 110 may have only one layer having three types of light transmitting patterns for outputting three primary color lights. In case that there is only one light source, it may time-divisionally emit the three primary color lights. In this way, it can achieve the same effects as the embodiments of the present disclosure. In other embodiments, the light guide plate 110 may have two layers, four layers or even more layers. Accordingly, the number of the light sources may be two, four or more, as long as the incident light from the light source can form monochromatic lights of at least three colors through the light transmitting patterns in the light guide plate, and the light sources can be time-divisionally lit so that the monochromatic lights of at least three colors are time-divisionally irradiated onto the same sub-pixel electrode on the first substrate in each frame time.

The light source is white light source.

Figure 8:
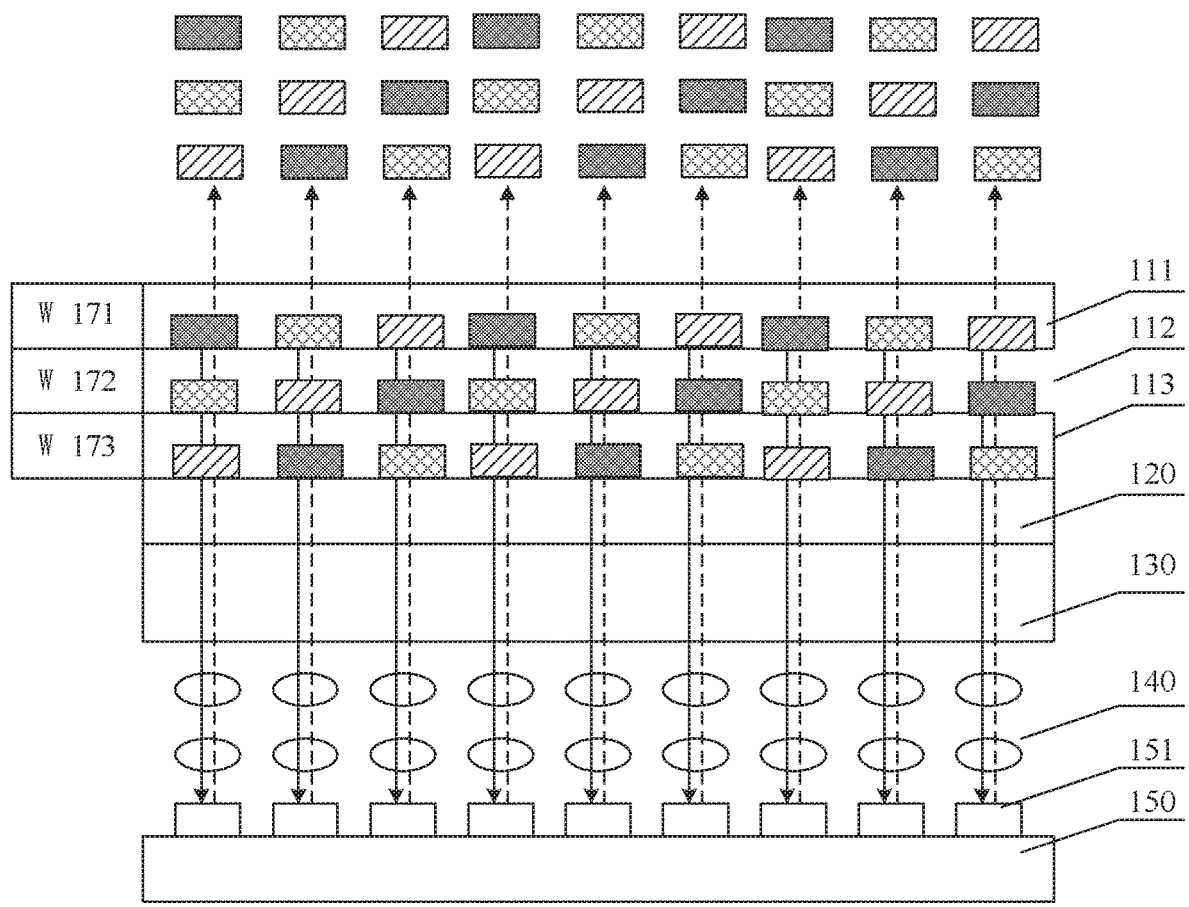
FIG. 8 is a schematic structural view of a display device according to another embodiment of the present disclosure.

As shown in FIG. 8, the light source 170 includes a first light source 171, a second light source 172, and a third light source 173, wherein the first light source 171, the second light source 172, and the third light source 173 are all white (W) light sources, respectively.

The light guide plate 110 is a three-layer light guide plate. The first light source 171 is disposed on a light entrance side of a first layer of light guide plate 111, the second light source 172 is disposed on a light entrance side of a second layer of light guide plate 112, and the third light source 173 is disposed on a light entrance side of a third layer of light guide plate 113.

Figure 9:
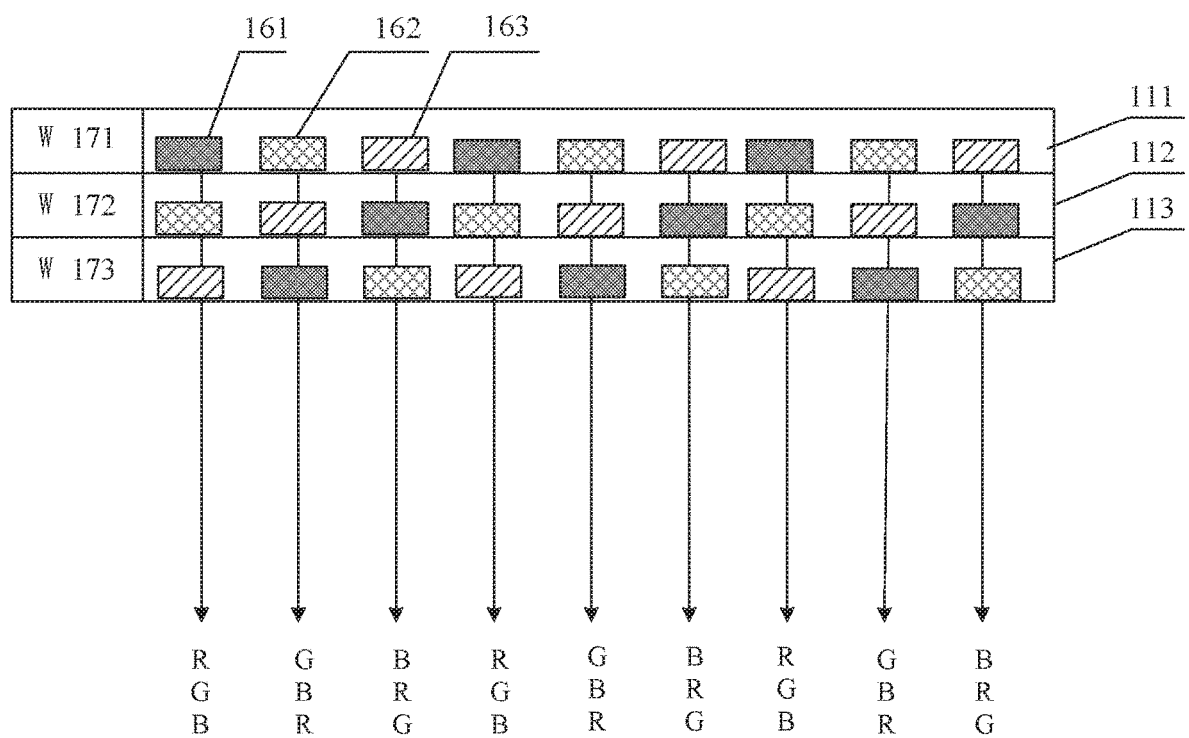
FIG. 9 is a schematic view showing emergent lights from a multilayer light guide plate in the display device shown in FIG. 8.

As shown in FIG. 8 and FIG. 9, different light transmitting patterns 160 are respectively disposed on the layers of light guide plate, and the first light guide plate 111, the second light guide plate 112, and the third light guide plate 113 are all provided with first light transmitting patterns 161, second light transmitting patterns 162, and third light transmitting patterns 163. The light transmitting patterns 160 in the same column of the three layers of light guide plate are different, so that the sequence of light emission after the white light being split by the light transmitting patterns in the first layer of light guide plate 111 is RGB and repeats in this way, the sequence of light emission after the white light being split by the light transmitting patterns in the second layer of light guide plate 112 is GBR and repeats in this way, and the sequence of light emission after the white light being split by the light transmitting patterns in the third layer of light guide plate 113 is BRG and repeats in this way.

In other embodiments, similar to FIG. 5, it is possible to set the light transmitting patterns in the same layer of light guide plate to be the same. In such a case, the sequences of light emission after the white light being split in various layers of light guide plate are the same. It is also possible to be similar to FIG. 8, but the sequences of light emission are different, as long as it is ensured that the emergent lights from the three layers of light guide plate are combined into RGB at one and the same position. Thus, the sequence(s) of the monochromatic lights irradiated onto one of adjacent sub-pixel electrodes may be same as or different from the sequence(s) of the monochromatic lights irradiated onto another of the adjacent sub-pixel electrodes, depending on the light transmitting patterns disposed in the three layers of light guide plate.

The first light source 171, the second light source 172 and the third light source 173 are time-divisionally lit in each frame time, each of the first light source, the second light source and the third light source is lit for one-third of each frame time, and incident lights from the first light source, the second light source and the third light source transmit through the light transmitting patterns of the three-layer light guide plate, to respectively form the monochromatic lights of three colors in a time-division manner, so as to be irradiated onto the same sub-pixel electrode on the first substrate.

As can be seen from FIG. 8 and FIG. 9, the incident lights from the light sources are irradiated onto the first substrate 150 in a direction perpendicular to the first substrate through the light transmitting patterns, and projections of the light transmitting patterns (i.e., 161, 162, and 163) in the three layers of light guide plate corresponding to the same sub-pixel electrode overlap with one another in a projection plane of the light guide plate in a direction perpendicular to the light guide plate. The term 'overlap' refers to a positional overlap of the projections of the light transmitting patterns in the projection plane of the light guide plate in the direction perpendicular to the light guide plate, and the minimum feature size (pitch) of the light transmitting patterns in each layer may be different.

Figure 10:
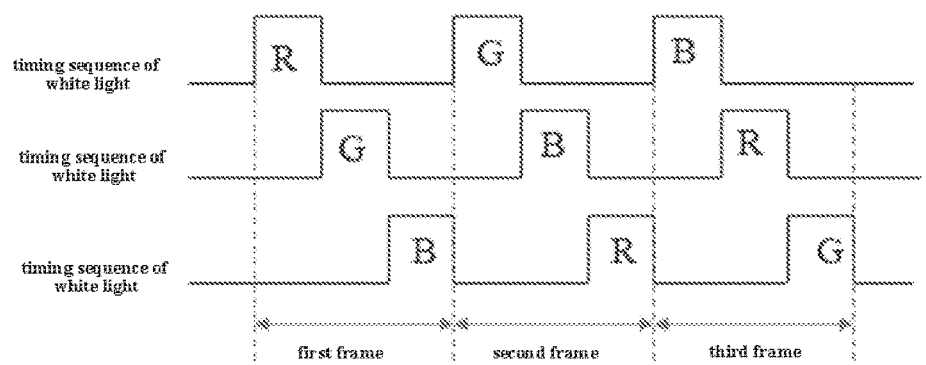
FIG. 10 is a timing diagram showing a time-division lighting of light sources in the display device shown in FIG. 8.

As shown in FIG. 10, it is a timing diagram showing a time-division lighting of the light sources, it can be seen from the figure that the three light sources are time-divisionally lit in one frame. For example, if one frame time is 1/60s, the three light sources are each time-divisionally lit for 1/180s, thereby realizing RGB three-primary-color display at the location of one sub-pixel cell. Compared with the solution that only one primary color can be displayed in one sub-pixel cell in the related art, it achieves a display with a higher PPI.

It should be noted that the timing sequence(s) of time-division lighting of the light sources may be changed, and it is not limited to the timing diagram in FIG. 10, as long as each monochromatic light is time-divisionally lit in one frame. That is to say, since the timing sequences of time-division lighting of the light sources are different, the sequences of the monochromatic lights irradiated on the adjacent sub-pixel electrodes may be the same or different, and the sequences of primary color components of pixel images of the adjacent three sub-pixel electrodes may be different.

In addition, in the embodiment of the present disclosure, the light guide plate 110 has three layers, which respectively output three primary color lights. In other embodiments, the light guide plate 110 may be of other structures. For example, the light guide plate 110 may have four layers or even more layers, as long as the incident light from the light source can form monochromatic lights of at least three colors through the light transmitting patterns in the light guide plate, and the light sources can be time-divisionally lit so that the monochromatic lights of at least three colors are time-divisionally irradiated onto the same sub-pixel electrode on the first substrate in each frame time.

A display method according to an embodiment of the present disclosure includes:

time-divisionally lighting a light source so that monochromatic lights of at least three colors formed by an incident light from the light source transmitting through a light transmitting pattern in a light guide plate are time-divisionally irradiated onto a same sub-pixel electrode on a first substrate in each frame time, to form reflected lights; and modulating the reflected lights by a liquid crystal layer, so as to be displayed.

In the embodiment of the present disclosure, since the light source is time-divisionally lit, the monochromatic lights of at least three colors are time-divisionally irradiated onto a same sub-pixel electrode on the first substrate in each frame time, that is to say, monochromatic lights of at least three colors may be displayed at the location of each sub-pixel cell, rather than only one monochromatic light being displaying thereat, thereby increasing the PPI of the display device.

Referring to the description of the above embodiments, as an example, the first substrate is a TFT substrate, and the second substrate is a transparent substrate.

Since monochromatic lights of at least three colors may be displayed at the location of each sub-pixel cell by means of the light source, the second substrate may adopt a transparent substrate. Compared with a color film substrate with RGB color resistances in the related art, the embodiment of the present disclosure may effectively improve utilization of the incident light and in turn increase light output brightness of the display device.

As an example, the light transmitting patterns are nano-structured light transmitting patterns, and the incident light from the light source is irradiated onto the first substrate in a direction perpendicular to the first substrate through the nano-structured light transmitting patterns. The light guide plate is of a structure of at least three layers and the light transmitting patterns of the three layers of light guide plate corresponding to the same sub-pixel electrode overlap with one another in a projection plane of the light guide plate in a direction perpendicular to the light guide plate.

In the related art, after the incident light transmits through the light transmitting patterns in the light guide plate, emergent lights are emitted towards the sub-pixel electrode on the TFT substrate at a certain angle, and then the emergent lights are reflected back by the sub-pixel electrode on the TFT substrate. The reflected lights have a certain angle with respect to the emergent lights irradiated onto the TFT substrate, which results in a relatively poor color contrast of the display device and a cross color phenomenon. In the embodiment of the present disclosure, the emergent lights irradiated onto the TFT substrate and the monochromatic lights emitted after being reflected by a reflective layer on the TFT substrate are both perpendicular to the TFT substrate, thereby improving the contrast of the display device and reducing possibility of cross color.

As an example, the light source comprises a first light source, a second light source and a third light source, wherein the first light source, the second light source and the third light source are all white light sources; or, the first light source is a first monochromatic light source, the second light source is a second monochromatic light source, and the third light source is a third monochromatic light source.

The light guide plate is a three-layer light guide plate, the first light source is disposed on a light entrance side of a first layer of light guide plate, the second light source is disposed on a light entrance side of a second layer of light guide plate, and the third light source is disposed on a light entrance side of a third layer of light guide plate.

The time-divisionally lighting the light source so that the monochromatic lights of at least three colors formed by the incident light from the light source transmitting through the light transmitting pattern in the light guide plate are time-divisionally irradiated onto the same sub-pixel electrode on the first substrate in each frame time comprises:

time-divisionally lighting the first light source, the second light source and the third light source in each frame time, each of the first light source, the second light source and the third light source being lit for one-third of each frame time, and incident lights from the first light source, the second light source and the third light source transmitting through the light transmitting pattern in the three-layer light guide plate, to respectively form the monochromatic lights of three colors in a time-division manner, so as to be irradiated onto the same sub-pixel electrode on the first substrate.

For example, if one frame time is 1/60s, the light sources are each time-divisionally lit for 1/180s, thereby realizing RGB three-primary-color display at the location of one sub-pixel cell. Compared with the solution that only one primary color can be displayed in one sub-pixel cell in the related art, it achieves a display with a higher PPI.

As an example, the first light source, the second light source and the third light source are all white light sources, the sequence(s) of the monochromatic lights irradiated onto one of adjacent sub-pixel electrodes may be same as or different from the sequence(s) of the monochromatic lights irradiated onto another of the adjacent sub-pixel electrodes, depending on light transmitting patterns disposed in the three-layer light guide plate.

In addition, the sequences of the monochromatic lights irradiated on the adjacent sub-pixel electrodes are the same or different, depending on the timing sequences of time-division lighting of the light sources. For example, the timing sequence of the lighting in a first frame may be RGB, the timing sequence of the lighting in a second frame may be GBR, and the timing sequence of the lighting in a third frame may be BRG, and the timing sequences change among frames repeatedly in this way; or, it repeats in other orders; or, the timing sequence may also always be RGB, or GBR, or BRG. That is to say, the sequences of primary color components of pixel images of the adjacent three sub-pixel electrodes may be different.

In the embodiment of the present disclosure, since the light source is time-divisionally lit, the monochromatic lights of at least three colors are time-divisionally irradiated onto a same sub-pixel electrode on the first substrate in each frame time, that is to say, monochromatic lights of at least three colors may be displayed at the location of each sub-pixel cell, rather than only one monochromatic light being displaying thereat, thereby increasing the PPI of the display device.

Further, since the second substrate is a transparent substrate, it effectively improves utilization of the incident light and in turn increases light output brightness of the display device.

Further, the emergent lights are irradiated onto the first substrate in a direction perpendicular to the first substrate, which can improve the contrast of the display device and reduce the cross color.

In a specific implementation, the display device according to the embodiments of the present disclosure may be any product or component having a display function, such as a mobile phone, a tablet computer, a television set, a display, a laptop computer, a digital photo frame, a navigator, and the like. Other essential components of the display device may be expected by those skilled in the art, therefore they will not be described herein and they should not be construed as limiting the present disclosure.

The embodiments disclosed in the present disclosure are as described above, but they are merely provided to facilitate the understanding of the present disclosure, and are not intended to limit the present disclosure. Any modifications and variations may be made by those skilled in the art in terms of form and detail without departing from the spirit and scope of the present disclosure, but the scope of the present disclosure is defined by the appended claims.

What is claimed is:

1. A display device, comprising:
a light source;
a light guide plate; and
a liquid crystal display panel comprising a first substrate and a second substrate aligned with and assembled to the first substrate and a liquid crystal layer between the first substrate and the second substrate,
wherein different light transmitting patterns are provided in the light guide plate, and an incident light from the light source is configured to transmit through the light transmitting patterns in the light guide plate to form monochromatic lights of at least three colors;
wherein the light source is time-divisionally lit, so that the monochromatic lights of at least three colors are time-divisionally irradiated onto a same sub-pixel electrode on the first substrate in each frame time to form reflected lights, and then the reflected lights are modulated by the liquid crystal layer to be displayed;
wherein the first substrate is a thin film transistor substrate, and the second substrate is a transparent substrate; and
wherein the light source comprises a white light source; or the light source comprises monochromatic light sources capable of emitting lights of at least three colors respectively.

2. The display device according to claim 1, wherein the light source comprises a first light source, a second light source and a third light source,
the first light source, the second light source and the third light source are all white light sources; or, the first light source is a first monochromatic light source, the second light source is a second monochromatic light source, and the third light source is a third monochromatic light source, and colors of lights emitted by the first monochromatic light source, the second monochromatic light source and the third monochromatic light source are different from one another, and
the light guide plate is a three-layer light guide plate, the first light source is disposed on a light entrance side of a first layer of light guide plate, the second light source is disposed on a light entrance side of a second layer of light guide plate, and the third light source is disposed on a light entrance side of a third layer of light guide plate.

3. The display device according to claim 2, wherein the first light source, the second light source and the third light source are time-divisionally lit in each frame time, each of the first light source, the second light source and the third light source is lit for one-third of each frame time, and incident lights from the first light source, the second light source and the third light source transmit through the light transmitting patterns in the three-layer light guide plate, to respectively form the monochromatic lights of three colors in a time-division manner, so as to be irradiated onto the same sub-pixel electrode on the first substrate.

4. The display device according to claim 3, wherein,
the first light source, the second light source and the third light source are all white light sources, and a sequence of the monochromatic lights irradiated onto one of adjacent sub-pixel electrodes is the same as or different from a sequence of the monochromatic lights irradiated onto another of the adjacent sub-pixel electrodes, depending on light transmitting patterns disposed in the three-layer light guide plate.

5. The display device according to claim 1, wherein the light transmitting patterns are nano-structured light transmitting patterns, and the incident light from the light source is irradiated onto the first substrate in a direction perpendicular to the first substrate through the nano-structured light transmitting patterns; and
wherein the light guide plate comprises at least three layers of light guide plate, and projections of light transmitting patterns in the three layers of light guide plate corresponding to the same sub-pixel electrode overlap with one another in a projection plane of the light guide plate in a direction perpendicular to the light guide plate.

6. A display method, comprising:
time-divisionally lighting a light source so that monochromatic lights of at least three colors formed by an incident light from the light source transmitting through different light transmitting patterns in a light guide plate are time-divisionally irradiated onto a same sub-pixel electrode on a first substrate in each frame time, to form reflected lights; and
modulating the reflected lights by a liquid crystal layer, so as to be displayed,
wherein the first substrate is a thin film transistor substrate; and
wherein the light source comprises a white light source; or the light source comprises monochromatic light sources capable of emitting lights of at least three colors respectively.

7. The display method according to claim 6, wherein the light source comprises a first light source, a second light source and a third light source,
the first light source, the second light source and the third light source are all white light sources; or, the first light source is a first monochromatic light source, the second light source is a second monochromatic light source, and the third light source is a third monochromatic light source, and colors of lights emitted by the first monochromatic light source, the second monochromatic light source and the third monochromatic light source are different from one another,
the light guide plate is a three-layer light guide plate, the first light source is disposed on a light entrance side of a first layer of light guide plate, the second light source is disposed on a light entrance side of a second layer of light guide plate, and the third light source is disposed on a light entrance side of a third layer of light guide plate, and
the time-divisionally lighting the light source so that the monochromatic lights of at least three colors formed by the incident light from the light source transmitting through the light transmitting patterns in the light guide plate are time-divisionally irradiated onto the same sub-pixel electrode on the first substrate in each frame time comprises:
time-divisionally lighting the first light source, the second light source and the third light source in each frame time, each of the first light source, the second light source and the third light source being lit for one-third of each frame time, and incident lights from the first light source, the second light source and the third light source transmitting through the light transmitting patterns in the three-layer light guide plate, to respectively form the monochromatic lights of three colors in a time-division manner, so as to be irradiated onto the same sub-pixel electrode on the first substrate.

8. The display method according to claim 6, wherein the light transmitting patterns are nano-structured light transmitting patterns, and the incident light of the light source is irradiated onto the first substrate in a direction perpendicular to the first substrate through the nano-structured light transmitting patterns; and wherein the light guide plate comprises at least three layers of light guide plate, and light transmitting patterns in the three layers of light guide plate corresponding to the same sub-pixel electrode overlap with one another in a projection plane of the light guide plate in a direction perpendicular to the light guide plate.

* * * * *